May 30, 1961 B. H. TONGUE 2,986,706

COUPLING REDUCING APPARATUS

Filed Jan. 16, 1958 2 Sheets-Sheet 1

INVENTOR.
BEN H. TONGUE

BY Rines and Rines

ATTORNEYS

May 30, 1961 B. H. TONGUE 2,986,706

COUPLING REDUCING APPARATUS

Filed Jan. 16, 1958 2 Sheets-Sheet 2

INVENTOR.
BEN H. TONGUE
BY Rines and Rines
ATTORNEYS

2,986,706

COUPLING REDUCING APPARATUS

Ben H. Tongue, West Orange, N.J., assignor to Blonder-Tongue Electronics, a corporation of New Jersey Filed Jan. 16, 1958, Ser. No. 709,333
3 Claims. (Cl. 330—80)

The present invention relates to apparatus for rendering coupling circuits ineffective at a plurality of separated frequencies.

From the earliest days of neutralizing circuits, numerous proposals have been offered for rendering coupling circuits ineffective at particular frequencies or over bands of frequencies. As an illustration, a very effective broad-band system for triode electron tubes and the like is described in my prior United States Letters Patent No. 2,761,023, issued August 28, 1956.

There are occasions, however, where it is desirable that a coupling circuit be rendered completely ineffective at two or more predetermined separated frequencies, as, for example, at the ends of a band or bands of frequencies, while of reduced coupling efficacy over the complete band or bands and in limited regions below and above the ends of the band or bands. Such a circumstance may arise, for example, where it is desired that complete neutralization of the coupling circuit take place at the frequency limits of a television band, with greatly reduced coupling effect over the band and immediately below and above the same.

It is to the solution of this problem that the present invention is directed, the invention having, as an object, the provision of a new and improved apparatus for accomplishing this end.

A further object is to provide novel apparatus for rendering coupling circuits ineffective, or of reduced effect, that is of particular advantage in triode and similar electron-tube circuits.

Other and further objects will be explained hereinafter and will be more particularly pointed out in the appended claims.

Figures 1, 2, 3:
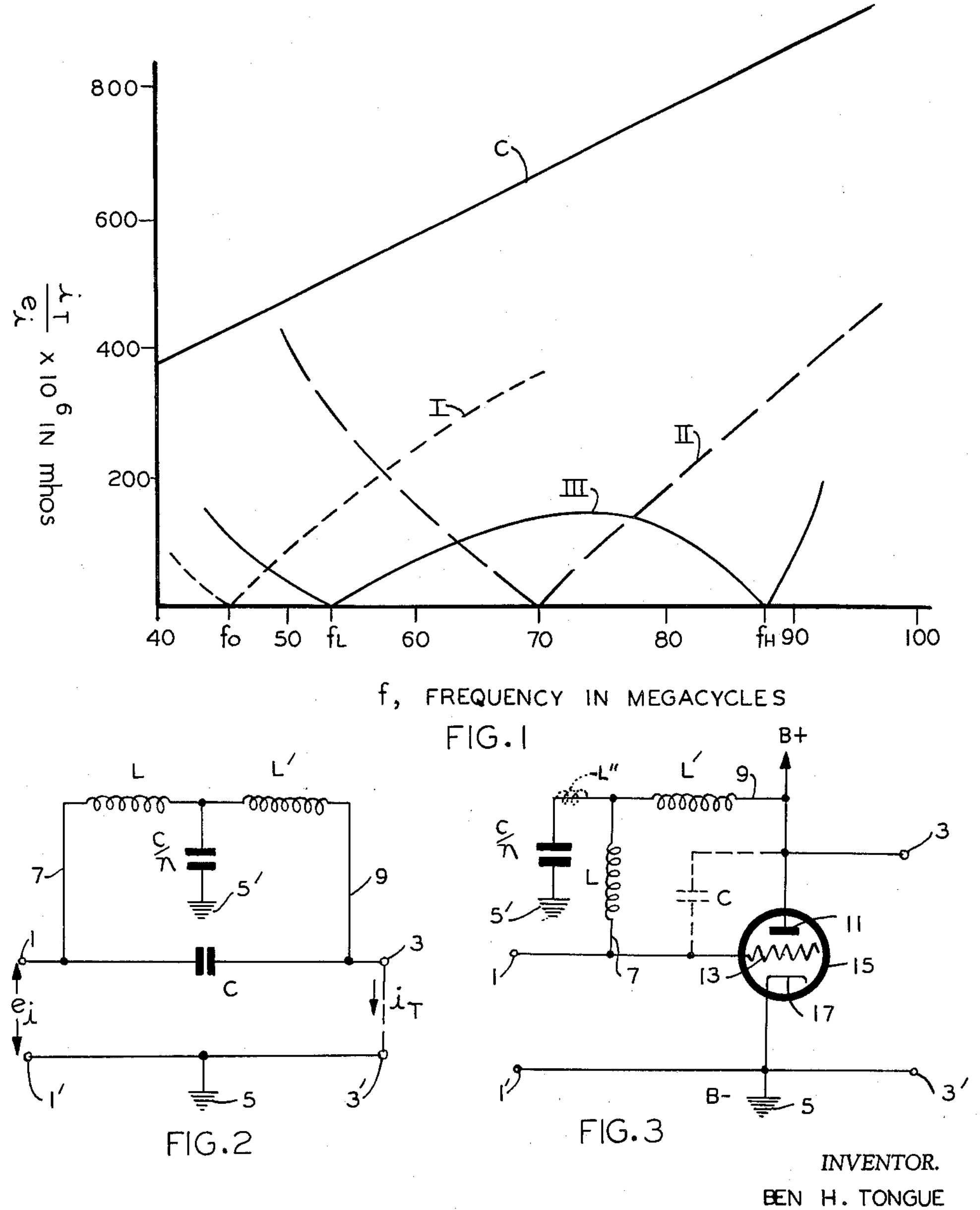
Figure 4:
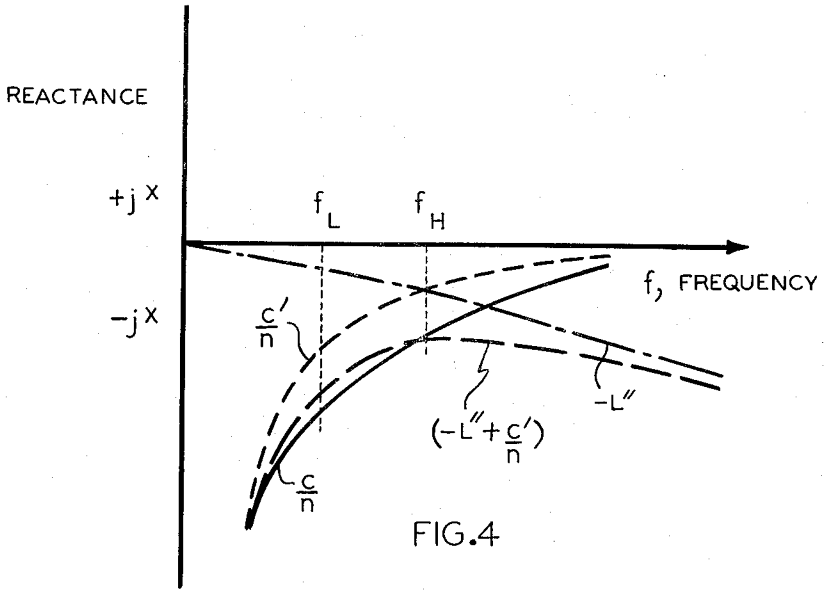

The invention will now be described in connection with the accompanying drawing, Figs. 1 and 4 of which are graphs presenting certain coupling-circuit performance characteristics; and Figs. 2 and 3 are schematic circuit diagrams of preferred apparatus for carrying out the invention.

A coupling circuit, generally schematically illustrated by a capacitor C, is shown in Fig. 2, coupling the upper input terminal 1 of a system to the upper output terminal 3. A common ground connection between second input and output terminals 1′ and 3′ is shown at 5, it being understood that the term "ground" as used in this specification and in the claims, is intended to connote not only actual earthing, but also chassis or other reference potential. Unless the lengths of the conductors interconnecting the input and output terminals 1 and 3 introduce serious resonance effects, the capacitance C will couple input voltages $e_1$ of a very great range of alternating-current frequencies between the input and output of the system with negligible attenuation. In Fig. 1, for example, the transfer conductance or transmission ratio of the short-circuited output current $i_T$ at the output terminals 3, 3′ to the input voltage $e_1$ is plotted along the ordinate, in units of mho's, as a function of frequency in megacycles, plotted along the abscissa. For illustrative purposes, the region of the lower VHF television band is selected in Fig. 1, as is a value of coupling capacitance C of 1.5 μμf., substantially equal to the grid-to-plate interelectrode capacitance C of a grounded cathode triode electron tube 15, shown in Fig. 3. It will be observed from the solid-line graph C of Fig. 1 that the frequencies from 40 to 100 megacycles are all well coupled by the capacitance C with from about 400 to over 800 units of transfer conductance.

It is this non-selective coupling that is to be altered, in accordance with the invention, to render the coupling circuit C substantially ineffective to couple any voltage at widely separated predetermined frequencies $f_L$ and $f_H$, which, in Fig. 1, correspond to the lower and upper frequency limits of about 54 and 88 megacycles of the before-mentioned lower VHF television band. More than this, greatly reduced coupling effect is to be maintained over the band between $f_H$ and $f_L$, and in limited regions below and above the said band, as well.

Were one to follow conventional techniques of resonating out the coupling capacitance C to neutralize the same at a frequency near the mid-frequency of the band, say about 70 megacycles, the characteristic shown in the dash-line graph II of Fig. 1, would be produced. While neutralization takes place at 70 megacycles, quite appreciable transfer conductances or transmission ratios $i_T/e_1$ of the order of 300 are produced at the limits $f_L$ and $f_H$ of the band, and greater ratios result there-beyond. Such conventional neutralizing procedures are thus not adapted to accomplish the before-mentioned results herein desired.

Those results are admirably produced, however, in accordance with the present invention and in the following manner. First, two or more series-connected inductors, shown for illustrative purposes as a pair of inductors L, L′ in Figs. 2 and 3, are connected by conductors 7 and 9 in parallel with the coupling circuit C. In Fig. 3, this connection extends between the plate or anode 11 and the control-grid electrode 13 of the before-mentioned triode or similar tube 15, the cathode 17 of which is grounded as at 5. The grid-to-plate coupling capacitance is there shown dotted at C. The positive terminal of the plate supply voltage is shown at B+, the ground terminal 5 being the negative B— terminal of the supply. The values of the series-connected inductors L, L′ are adjusted such that, together with the coupling circuit capacitance C, they resonate at a frequency below that of the lowest predetermined frequency $f_L$ at which the coupling effect of the capacitance C is to be substantially completely destroyed. In the illustration of Fig. 1, this resonance is shown in dotted curve I occurring at a frequency $f_0$, of about 46 megacycles, below the frequency $f_L$, for a value of $L=L'$ of about 4μh. Curve I, of course, like the mid-band neutralization curve II, does not produce the response necessary to solve the problem underlying this invention.

It is then necessary, in accordance with the invention, to connect shunt capacitance to ground from one or more intermediate points along the series-connected inductors L, L′. For illustrative purposes, a shunt capacitance is shown at $C/n$ in Figs. 2 and 3 connected from the junction of inductors L and L′ to the ground terminal 5′ that, of course, connects through ground to the ground terminal 5. To produce the necessary effect underlying the invention, however, the value of the capacitance $C/n$ must be quite critically determined. If C represents the before-described grid-to-plate capacitance, Fig. 3, for example, and the values of L and L′ are equal, the shunt capacitance C must have a value $C/n$ where $n$ has the following relationship with respect to the frequencies $f_0$, $f_H$ and $f_L$:

$$\left(\frac{f_H}{f_0}\right)^2 = 2n\left(1+\sqrt{1-\frac{1}{n}}\right) \quad (1)$$

and $$\left(\frac{f_L}{f_0}\right)^2=2n\left(1-\sqrt{1-\frac{1}{n}}\right) \tag{2}$$

In the above illustration, $n$ must have a value substantially equal to or more than unity, preferably about 1.26.

Under the circumstances of such a value of $C/n$, the resonance curve I is not only moved to the right, slightly, but its shape is completely modified. It has been found that, as shown in the solid-line graph III of Fig. 1, the $f_0$ resonant point of L, L′, C is now increased and moved up to the lower predetermined frequency $f_L$. The coupling circuit C is thus rendered completely ineffective at the frequency $f_L$. The slope of the curve III to the left of $f_L$ is rather gradual so that reduced coupling for frequencies in a limited region, down to about 45 megacycles, is also achieved. This value of $C/n$, moreover, has been found to serve the added purpose of resonating with the series-connected inductance elements L, L′, alone, considering the output terminals 3,3′ short-circuited (which is the effective condition for zero transmission or complete ineffectiveness of the coupling circuit C), at a frequency slightly higher than that of the upper predetermined frequency $f_H$ at which zero coupling is also to be achieved. This has been found, in the practical circuits of Figs. 2 and 3, to have the net effect for the whole circuit of providing a second resonance at precisely the frequency $f_H$ which, again, renders the coupling circuit completely ineffective at that upper limit. All this has been determined to occur, moreover, with greatly reduced coupling effect (less than about 175 units) in the complete band between $f_L$ and $f_H$ and over a limited region of a few megacycles just about $f_H$.

For this example of the equal inductors L and L′, the transfer conductance or transmission ratio $i_T/e_i$, as plotted at III, has been found to be substantially determined as follows:

$$\frac{i_T}{e_i}=j2\pi f\left[1-\frac{\left(\frac{f_0}{f}\right)^2}{1-\frac{1}{4_n}\left(\frac{f}{f_0}\right)^2}\right] \tag{3}$$

where $f$ is any frequency over the range in interest, $j$ is the imaginary quantity $\sqrt{-1}$, and $\pi$ is the ratio of the circumference to the diameter of a circle.

While only two inductors L and L′ have been illustrated, more than two may, of course, be used, provided with corresponding shunt capacitances. In cases, indeed, where the inductances are closely mutually coupled, an effective negative inductance may, of course, be present in series with the shunt capacitance $C/n$. The result of this effect may be understood from the following considerations. The reactance curve of the capacitance $C/n$ is plotted as a solid graph in Fig. 4. Assume that a larger capacitance $C'/n$ is employed (dash-line graph $C'/n$), and negative inductance $-L''$ (dash-dot graph L″) is inserted in series therewith of such value as to equal the reactance of $C/n$ at frequency $f_H$. The resultant "effective" capacitance $(-L''+C'/n)$, as shown in the long-dash curve of Fig. 4, will thus decrease above $f_H$. From Equation 3 it may be seen that the steepness of curve III of Fig. 1 above $f_H$ may be thereby reduced, as will the height of the curve III in the vicinity of 70 megacycles. Both of these effects, of course, may be quite desirable. The frequency $f_L$ will also increase somewhat thus reducing the width of the attenuation band. If, now, L and L′ are changed in value and $-L''$ is re-adjusted to re-attain the values $f_L$ and $f_H$, greater attenuation between $f_L$ and $f_H$ will be realized as well as a less steep rise above $f_H$. Through this expedient, therefore, a further control over the performance can be readily exercised.

In all cases, however, the tuning of the inductances and coupling capacitance is, as above described, effected at a frequency lower than $f_L$, and the shunt capacitance $C/n$, of appropriate value, increases that tuning to provide resonance at $f_L$ and tunes, also, with the inductances alone at a frequency just slightly greater than $f_H$. Under such circumstances, the novel results of the present invention may be obtained. Resonances in other than the illustrated television band may also be achieved and, indeed, even additional resonant points beyond $f_H$ may also, if desired, be similarly obtained.

Further modifications will occur to those skilled in the art and all such are considered to fall within the spirit and scope of the invention as defined in the appended claims.

What is claimed is:

1. A capacitance coupling circuit having means for rendering the circuit ineffective as a coupler at a plurality of predetermined relatively widely separated frequencies and of greatly reduced coupling effect over the band of frequencies between the predetermined separated frequencies and for frequencies over a limited region outside the said band with respect to the coupling effect which would exist in the absence of such means, the said means having a plurality of series-connected inductance elements connected in parallel with the coupling circuit and of magnitude sufficient to resonate with the capacitance of the coupling circuit at a frequency below the lowest of the plurality of predetermined separated frequencies, and further capacitance connected from one or more intermediate points of the series-connected inductance elements to ground and of value sufficiently small with respect to the value of the capacitance of the coupling circuit to increase the said resonance up to the said lowest of the plurality of predetermined separated frequencies, the further capacitance also resonating with the series-connected inductance elements alone at a frequency slightly higher than that of another of the said plurality of predetermined separated frequencies, said plurality of series-connected inductance elements comprising inductors of the same order of magnitude and the said further capacitance having a value $$\frac{1}{n}$$

times that of the capacitance of the coupling circuit, where $n$ has substantially the following relationship with respect to the said lowest predetermined frequency $f_L$, the said another of the predetermined frequencies $f_H$, and the said resonance frequency $f_0$ below the lowest predetermined frequency:

$$\left(\frac{f_L}{f_0}\right)^2=2n\left(1-\sqrt{1-\frac{1}{n}}\right)$$

and $$\left(\frac{f_H}{f_0}\right)^2=2n\left(1+\sqrt{1-\frac{1}{n}}\right)$$

2. The invention of claim 1, in which the said plurality of series-connected inductance elements are mutually coupled to one another to provide an effective negative inductance in series with the said further capacitance to ground.

3. An electronic amplifying device having input and output electrodes between which a predetermined capacitance coupling circuit exists, provided with means for rendering the predetermined capacitance coupling circuit ineffective as a coupler at a plurality of predetermined relatively widely separated frequencies and of greatly reduced coupling effect over the band of frequencies between the predetermined separated frequencies and for frequencies over a limited region outside the said band with respect to the coupling effect which would exist in the absence of such means, the said means having, in combination with the said predetermined capacitance coupling circuit, a plurality of series-connected inductance elements connected in parallel with the coupling circuit and of magnitude sufficient to resonate with the capacitance of the coupling circuit at a frequency below the lowest of the plurality of predetermined separated frequencies, and further capacitance connected from one or more intermediate points of the series-connected inductance elements to ground and of value sufficiently small with respect to the value of the capacitance of the coupling circuit to increase the said resonance up to the said lowest of the plurality of predetermined separated frequencies, the further capacitance also resonating with the series-connected inductance elements alone at a frequency slightly higher than that of another of said plurality of predetermined separated frequencies, said plurality of series-connected inductance elements comprising inductors of the same order of magnitude and the said further capacitance having a value $$\frac{1}{n}$$

times that of the capacitance of the coupling circuit, where $n$ has substantially the following relationship with respect to the said lowest predetermined frequency $f_L$, the said another of the predetermined frequncies $f_H$, and the said resonance frequency $f_0$ below the lowest predetermined frequency:

$$\left(\frac{f_L}{f_0}\right)^2=2n\left(1-\sqrt{1-\frac{1}{n}}\right)$$

and $$\left(\frac{f_H}{f_0}\right)^2=2n\left(1+\sqrt{1-\frac{1}{n}}\right)$$

References Cited in the file of this patent

UNITED STATES PATENTS

| | | |
|---|---|---|
| 1,764,206 | Hull | June 17, 1930 |
| 1,925,568 | Roberts | Sept. 5, 1933 |
| 1,945,427 | Farnham | Jan. 30, 1934 |
| 1,970,933 | Frederick | Aug. 21, 1934 |
| 2,344,734 | Roberts | Mar. 21, 1944 |
| 2,691,078 | Gluyas | Oct. 9, 1954 |
| 2,761,023 | Tongue | Aug. 28, 1956 |
| 2,762,018 | Purington | Sept. 4, 1956 |